US007873945B2

(12) United States Patent
Musuvathi et al.

(10) Patent No.: US 7,873,945 B2
(45) Date of Patent: Jan. 18, 2011

(54) AUTOMATICALLY GENERATING TEST CASES FOR BINARY CODE

(75) Inventors: Madanlal Musuvathi, Redmond, WA (US); Lin Tan, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 872 days.

(21) Appl. No.: 11/770,905

(22) Filed: Jun. 29, 2007

(65) Prior Publication Data
US 2009/0007077 A1 Jan. 1, 2009

(51) Int. Cl.
*G06F 9/44* (2006.01)
(52) U.S. Cl. .................. 717/124; 717/131; 717/104; 717/106
(58) Field of Classification Search .................. 717/124
See application file for complete search history.

(56) References Cited

U.S. PATENT DOCUMENTS

| | | | |
|---|---|---|---|
| 5,542,043 | A | 7/1996 | Cohen et al. |
| 5,754,760 | A | 5/1998 | Warfield |
| 6,002,869 | A | 12/1999 | Hinckley |
| 6,249,882 | B1 * | 6/2001 | Testardi ................ 714/38 |
| 6,421,822 | B1 * | 7/2002 | Pavela ................. 717/125 |
| 6,601,018 | B1 * | 7/2003 | Logan ................. 702/186 |
| 6,944,848 | B2 * | 9/2005 | Hartman et al. ........ 717/124 |
| 7,024,589 | B2 | 4/2006 | Hartman et al. |
| 7,055,065 | B2 | 5/2006 | Farchi et al. |
| 7,707,553 | B2 * | 4/2010 | Roques et al. ......... 717/124 |
| 2003/0097650 | A1 * | 5/2003 | Bahrs et al. ........... 717/124 |
| 2003/0204784 | A1 * | 10/2003 | Jorapur ................. 714/38 |
| 2004/0025083 | A1 * | 2/2004 | Nanja et al. ............ 714/35 |
| 2004/0181713 | A1 | 9/2004 | Lambert |
| 2005/0160321 | A1 | 7/2005 | Cleaveland et al. |
| 2005/0229044 | A1 | 10/2005 | Ball |
| 2006/0010429 | A1 | 1/2006 | Ihara |
| 2006/0253739 | A1 | 11/2006 | Godefroid et al. |
| 2008/0178154 | A1 * | 7/2008 | Basler et al. .......... 717/124 |

OTHER PUBLICATIONS

Beyleda et al. "BINTEST—search-based test case generation" Computer Software and Application Conference, 2003. COMPSAC 2003. Proceedings 27th Annual International Publication Year: 2003, pp. 28-33.*
Paradkar et al. "Automatic test-generation for predicates [software testing]" Reliability, IEEE Transactions on, vol. 45, Issue: 4, pp. 515-530.*
Gao, Haichang, et al., "A kind of SAaGA Hybrid Meta-heuristic Algorithm for the Automatic Test Data Generation", 2005 IDDD, pp. 111-114.

(Continued)

*Primary Examiner*—Thomas K Pham
(74) *Attorney, Agent, or Firm*—Workman Nydegger

(57) ABSTRACT

The present invention extends to methods, systems, and computer program products for automatically generating test cases for binary code. Embodiments of the present invention can automatically generate test inputs for systematically covering program execution paths within binary code. By monitoring program execution of the binary code on existing or random test cases, branch predicates on execution paths can be dynamically inferred. These inferred branch predicates can then be used to drive the program along previously unexplored execution paths, enabling the learning of further execution paths. Embodiments of the invention can be used in combination with other analysis and testing techniques to provide better test coverage and expose program errors.

20 Claims, 5 Drawing Sheets

OTHER PUBLICATIONS

Korel, Bogdan, "Automated Software Test Data Generation", IEEE Transactions on Software Engineering, vol. 16 No. 8, Aug. 1990, pp. 870-879.

Liu, Hui, "Automated Verification and Test Case Generation for Input Validation", AST'06, May 23, 2006, Shanghai, China, 2006 ACM, pp. 29-35.

Yin, Huifang, et al., "Automatic Test Generation using Checkpoint Encoding and Antirandom Testing", Computer Science Technical Report, Colorade State University, Proceedings of the Eighth International Symposium on Software Reliability Engineering (ISSRE 1997) pp. 1-19.

* cited by examiner

```
...

1.  p = malloc (n) ;
    // probe p
    // probe n 2.  q = p + r ;
    ...

//probe q

3.  *q = 0 ;
```

500

AUTOMATICALLY GENERATING TEST CASES FOR BINARY CODE

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

Thus, there are an enormous variety of functions and applications that may be implemented by a general purpose computing system in response to the execution of a software application. The utility and functionality of the computing system does, however, rely on the proper coding of the source code that was compiled or interpreted into the binary instructions that are actually executed by the processor. If there is a coding or design error, this will often result in a deviation from expected behavior.

Conventional testing mechanisms can assist a developer in reducing the number of unexpected performance deviations in many software applications before and after the software applications are shipped to market. However, the creativity of software programmers and designers has led to increasingly complex and powerful software applications. As the complexity of the software application increases, so often does the number of lines of source code needed to generate the software application.

Thus, various automated testing techniques have been developed to assist developers in testing code. Many automated testing techniques generate sets of random input values that are then supplied to tested code. The execution of the code is then observed to determine if the code exhibits any undesired behavior. Some automated testing mechanisms "fuzz" (slightly vary) known valid inputs to generate sets of input that are more likely to occur in actually use. That is, undesired program behavior is more likely to occur due to one invalid input as opposed to some or all invalid inputs. For example, a program that receives four inputs can be called with three valid input values and one random input value.

Other "symbolic execution" based automated testing techniques analyze an execution path in a program on symbolic inputs and subsequently generate concrete inputs that satisfy all of the branch constraints in the execution path. However, these symbolic execution techniques require understanding the semantics of every instruction in the execution path, including calls to low-level libraries. Thus, symbolic execution techniques can lose precise input-dependency across such instructions and method calls.

Other automated testing techniques propose "predicate switching" to force a program to execute on a specified execution path for all inputs, by manually redirecting (mutating) branches.

BRIEF SUMMARY

The present invention extends to methods, systems, and computer program products for generating test cases for binary code. An analysis module accesses a portion of binary code that has a specified number of input variables. The analysis module analyzes the portion of binary code to identify the locations of conditional statements within the portion of binary code. Each conditional statement includes a branch predicate used to determine the direction of the branch execution within the portion of binary code.

An instrumentation module inserts instrumentation probes into the portion of binary code to probe input values supplied to the branch predicates of the identified conditional statements. Each inserted instrumentation probe is inserted into the portion of binary code at a location preceding the location of an identified conditional statement. Each instrumentation probe includes a probe predicate function configured to calculate a value for the branch predicate that is to be used in the conditional statement it precedes.

For each identified conditional statement a test runner submits a plurality of input test cases to the portion of binary code. The number of test cases is at least equal to the number of specified input variables plus one. For each input test case, the test runner submits a random input value for each different variable of the specified number of variables and receives an output value calculated by the probe predicate function preceding the conditional statement. The output value is generated from probe predicate function processing one or more of the input values.

An inference module using the input values included in each of the plurality of input test cases and the corresponding output values calculated by the probe predicate function to infer an equation representing the variable portion of the branch predicate of the conditional statement. A test case generator refines further input test cases for the portion of binary code to include input values that cause the conditional statement to take a path to further executable instructions, and not to exit the program, based on the inferred equation. Accordingly, executable instructions after the conditional statement (e.g., other conditional statements) can be more efficiently tested using the further input cases.

In some embodiments, branch predicates are linear functions solvable using algebraic techniques such that linear equations can be inferred for the branch predicates. In other embodiments, branch predicates are non-linear functions, such as, for example, arrays. In these other embodiments, non-linear functions are broken down into a series of linear functions such that linear equations can be inferred for the branch predicates.

In further embodiments, a portion of binary code is instrumented to check for memory buffer overruns. An analysis module analyzes the portion of binary code to identify memory related operations. An instrumentation module inserts instrumentation probes into the portion of binary code. For any identified memory allocation instructions, an instrumentation probe is inserted for the address and length of the allocated memory region. For any identified memory access instructions, an instrumentation probe is inserted for the address to be accessed. For any identified memory deallocation instructions, an instrumentation probe is inserted for the address freed.

A test case runner submits a plurality of input test cases to the portion of binary code. Each input test case including a plurality of input values. For each input test case, instrumentation probes monitor memory allocation and memory deallocation based on the input values and determines the memory region a memory access instruction is to access by doing a range search based on the input values. An inference module uses the input values included in each of the plurality of input test cases and the regions of memory that are to be accessed to infer locations for potential memory buffer overruns. A test case generator refines further input test cases to the portion of binary code to include input values configured to cause buffer overruns at the inferred locations so as to test the portion of binary code for buffer overruns.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
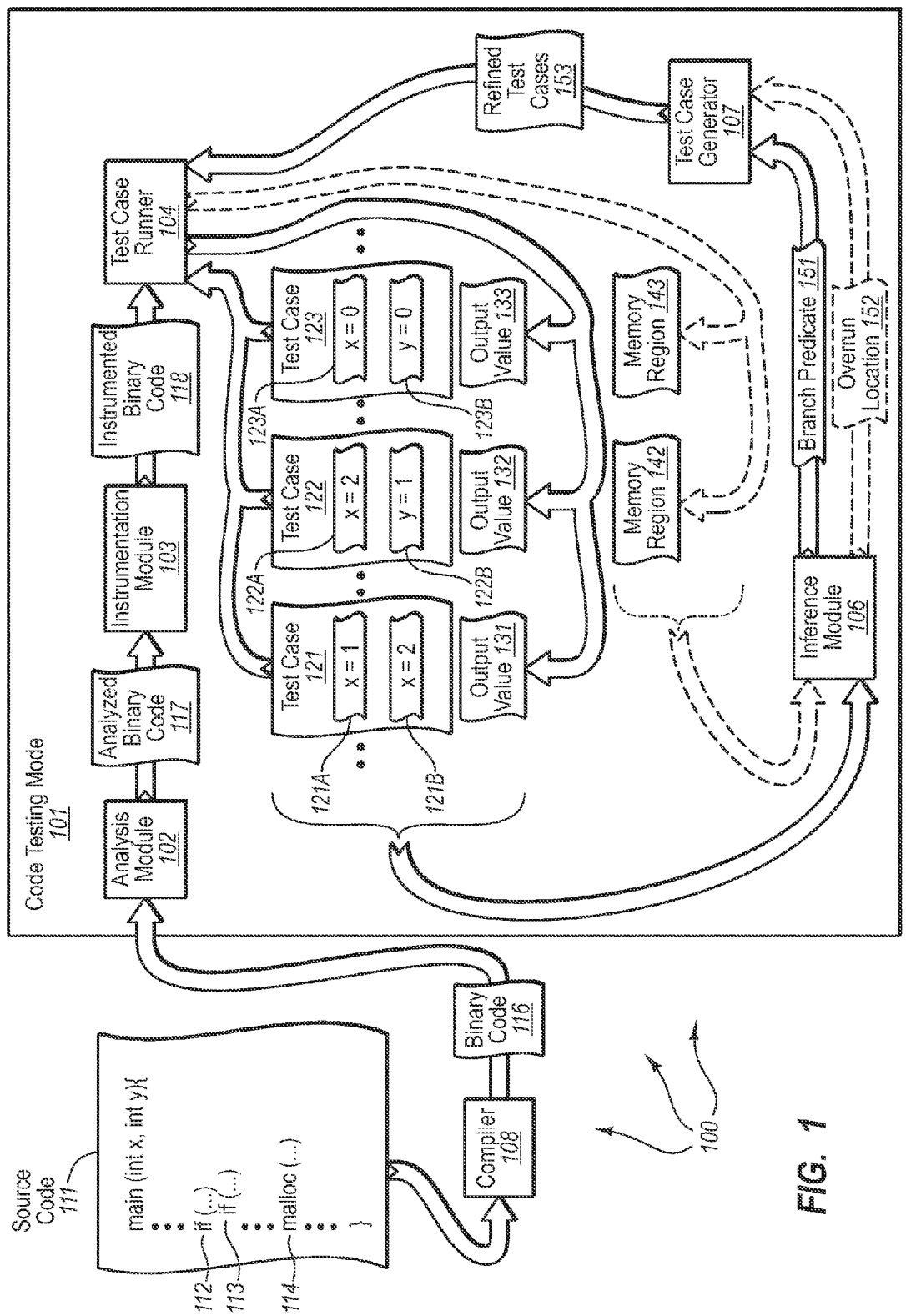
FIG. 1 illustrates an example computer architecture that facilitates automatically generating test cases for binary code.

The present invention extends to methods, systems, and computer program products for generating test cases for binary code. An analysis module accesses a portion of binary code that has a specified number of input variables. The analysis module analyzes the portion of binary code to identify the locations of conditional statements within the portion of binary code. Each conditional statement includes a branch predicate used to determine the direction of the branch execution within the portion of binary code.

An instrumentation module inserts instrumentation probes into the portion of binary code to probe input values supplied to the branch predicates of the identified conditional statements. Each inserted instrumentation probe is inserted into the portion of binary code at a location preceding the location of an identified conditional statement. Each instrumentation probe includes a probe predicate function configured to calculate a value for the branch predicate that is to be used in the conditional statement it precedes.

For each identified conditional statement a test runner submits a plurality of input test cases to the portion of binary code. The number of input test cases is at least equal to the number of specified input variables plus one. For each input test case, the test runner submits a random input value for each different variable of the specified number of variables and receives an output value calculated by the probe predicate function preceding the conditional statement. The output value is generated from probe predicate function processing one or more of the input values.

An inference module using the input values included in each of the plurality of input test cases and the corresponding output values calculated by the probe predicate function to infer an equation representing the variable portion of the branch predicate of the conditional statement. A test case generator refines further input test cases for the portion of binary code to include input values that cause the conditional statement to take a path to further executable instructions, and not to exit the program, based on the inferred equation. Accordingly, executable instructions after the conditional statement (e.g., other conditional statements) can be more efficiently tested using the further input cases.

In some embodiments, branch predicates are linear functions solvable using algebraic techniques such that linear equations can be inferred for the branch predicates. In other embodiments, branch predicates are non-linear functions, such as, for example, arrays. In these other embodiments, non-linear functions are broken down into a series of linear functions such that linear equations can be inferred for the branch predicates.

In further embodiments, a portion of binary code is instrumented to check for memory buffer overruns. An analysis module analyzes the portion of binary code to identify memory related operations. An instrumentation module inserts instrumentation probes into the portion of binary code. For any identified memory allocation instructions an instrumentation probe is inserted for the address and length of the allocated memory region. For any identified memory access instructions an instrumentation probe is inserted for the address to be accessed. For any identified memory deallocation instructions a instrumentation probe is inserted for the address freed.

A test case runner submits a plurality of input test cases to the portion of binary code. Each input test case including a plurality of input values. For each input test case, instrumentation probes monitor memory allocation and memory deallocation based on the input values and determines the memory region a memory access instruction is to access by doing a range search based on the input values. An inference module uses the input values included in each of the plurality of input test cases and the regions of memory that are to be accessed to infer locations for potential memory buffer overruns. A test case generator refines further input test cases to the portion of binary code to include input values configured to cause buffer overruns at the inferred locations so as to test the portion of binary code for buffer overruns.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates automatically generating test cases for binary code. Depicted in computer architecture 100 code testing module 101, including analysis module 102, instrumentation module 103, test case runner 104, inference module 106, and test case generator 107, and compiler 108. Code testing module 101, analysis module 102, instrumentation module 103, test case runner 104, inference module 106, test case generator 107, and compiler 108 can be connected to one another via a system bus and/or network. A network can be virtually any network or combination thereof, such as, for example, a Local Area Network ("LAN"), a Wide Area Network ("WAN"), and even the Internet. Accordingly, code testing module 101, analysis module 102, instrumentation module 103, test case runner 104, inference module 106, test case generator 107, and compiler 108, as well as any other connected computer systems, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, compiler 108 is configured to receive source code and compile the source code into corresponding binary code. Source code can be instructions in a wide variety of different programming languages including, C++, C#, and Visual Basic. In some embodiments, compiler 108 is a compiler that compiles source code into directly into an executable format (e.g., assembly language operation codes) compatible with computer architecture 100.

In other embodiments, compiler 108 is an appropriately configured compiler (e.g., a Microsoft® .NET compiler) that can receive source code (e.g., C#, C++, or Visual Basic source code) and compile the source code into language independent portable executables containing metadata and intermediate language instructions. Metadata describes the types, members (e.g., methods, fields, properties, events), and attributes defined in the source code. Intermediate language instructions are operation codes that perform operations on portions of metadata (e.g., metadata tokens) when a portable executable is executed. Subsequently, a just-in-time compiler that translates language independent portable executables into machine specific executable code (e.g., compatible with computer architecture 100) can facilitate the coordination of operation codes and portions of metadata at the time of execution.

Generally, code testing module 101 is configured to infer relationships between interesting values in a program and its inputs. Code testing module 101 can monitor the values dynamically during program executions. Accordingly, code testing module 101 (at least in part though its sub modules) can learn interesting invariants about a program that can supplement and extend other existing static and dynamic analysis and testing techniques. As depicted, code testing module 101 includes analysis module 102, instrumentation module 103, test case runner 104, inference module 106 and test case generator 107.

Analysis module 102 is configured to analyze binary code to identify locations of interest, such as, for example, the location of conditional statements and the location of memory operations (e.g., allocation, access, deallocation), within binary code. Analysis module 102 is also configured to identify relations utilized at identify locations of interest. For example, when analysis module 102 identifies a conditional statement it can also identify a relation (e.g., $\leq, \geq, \neq, =, >, <$, etc.) utilized in the conditional statement.

Instrumentation module 103 is configured to insert instrumentation probes (e.g., additional non-intrusive binary instructions) into binary code at or near identified locations of interest. For example, instrumentation module 103 can insert instrumentation probes immediately preceding a conditional statement or memory operation in binary code. A conditional statement is a request to make an execution choice based on a given condition, such as, for example, in an if-then clause or case statement. For conditional statements, an instrumentation probe can collect probe function values and indicate utilized relation symbols (e.g., $\leqq$, $\geqq$, $\neq$, $=$, $>$, $<$, etc.), for example, identified by analysis module 102. Accordingly, values and an indicated relation can be collected when the instrumented binary code is executed.

An instrumentation probe can collect values for relevant variables prior to a conditional statement or memory operation. For example, an instrumentation probe can collect values that are to be used to evaluate a variable portion of a branch predicate for a conditional statement (e.g., "x+2" is the variable portion of the branch predicate "x+2>0"). An instrumentation probe can also collect values for a memory operation to determine: memory addresses, memory lengths, offsets into an allocated memory buffer, and freed addresses.

Figures 2, 3:
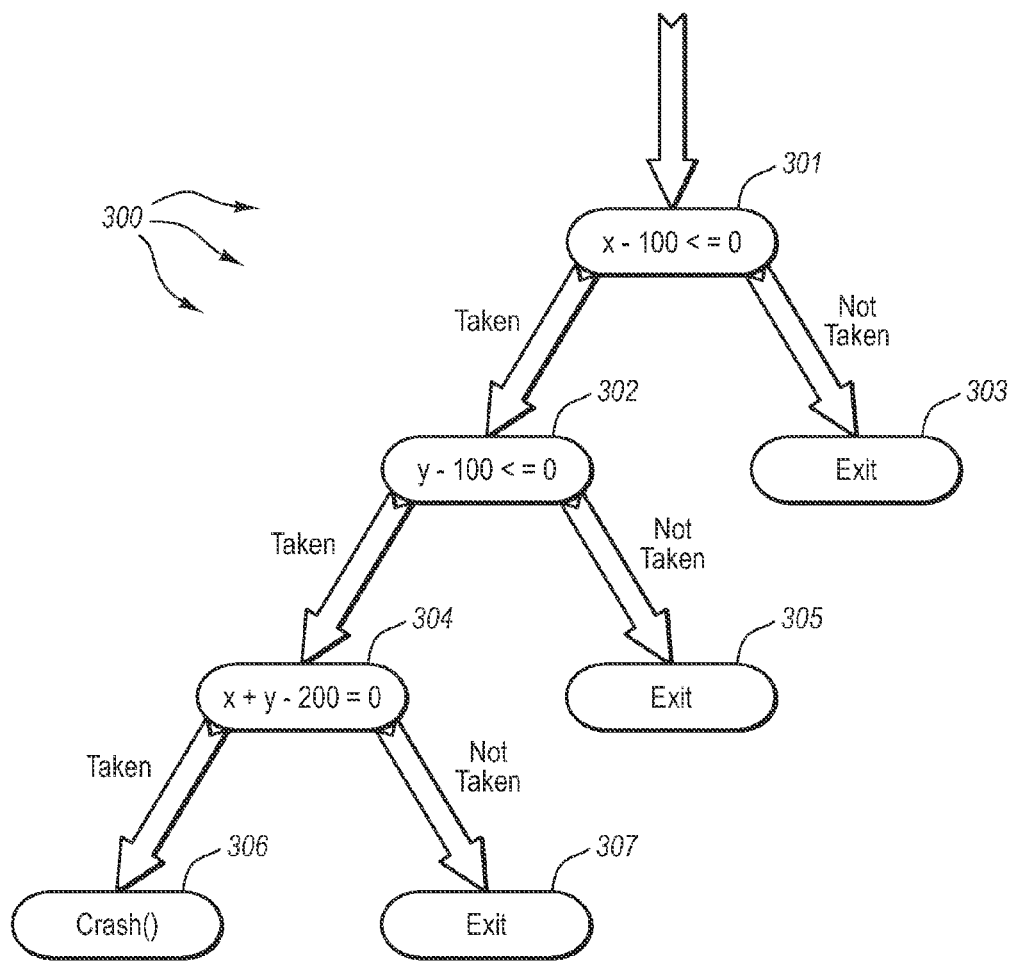
FIG. 2 illustrates an example of a portion of uninstrumented code and a corresponding portion of instrumented code
FIG. 3 illustrates a predicate tree for conditional statements in a portion of binary code.

In some embodiments, assembly instructions are instrumented to collect values at locations of interest within the assembly instructions. FIG. 2 depicts an example of a portion of uninstrumented code 201 and a corresponding portion of instrumented code 251 (for x86 binaries). Lines 252 and 253 together represent a less than or equal to conditional statement. Probe instruction 261 is added to instrumented code 251.

In the example in FIG. 2, the compare instruction, cmp, sets the values of the EFLAGS register in such a way that the subsequent branch jle is taken (a jump to the location identified by "label") whenever eax minus ebx is less than or equal to zero. Probe instruction 261 is configured to probe the value of eax minus ebx at this branch, along with the indicated relation $\leqq$ previously identified from the branch instruction.

Test case runner 104 is configured to receive instrumented binary code and test cases and execute the binary code based on input values included in the test cases. Test cases can include test (and potentially random) values for variables defined in the instrumented binary code. During execution instrumentation probes can collect variable values at locations of interest within the instrumented binary code. For example, probe instruction 261 can collect the value of eax minus ebx and the indicated relation $\leqq$ for a plurality of different test cases having varied input values.

Similar probe instructions can be added prior for each conditional statement within a portion binary code. Accordingly, test case runner can collect values and inferred relations for a plurality of conditional statements within a portion of binary code. Test case runner 104 can receive and store collected values from instrumentation probes. Test case runner 104 can store values collected during execution of a test case with the input values for the test case.

Inference module 106 is configured to receive input values and corresponding output values for a plurality of different test cases for locations of interest within binary code. From the plurality of input values and corresponding output values, inference module 106 can infer the behavior of the binary code at the location of interest. For a conditional statement, inference module 106 can infer a branch predicate. For example, inference module 106 can evaluate input values from different test cases submitted to instrumented code 251 along with values probe instruction 261 collects during execution based on the different test cases. Based on the evaluation, inference module 106 can infer the branch predicate for the conditional statement represented at lines 252 and 253.

For memory operations, inference module 106 can infer an allocated or deallocated address, a memory length, an offset into an allocated memory region, etc.

Accordingly, inference module 106 can send infer relationships and behaviors that can be used to generate further more meaningful test cases. For example, when testing conditional statements, inference module 106 can infer an equation representing the variable portion of the conditional statement's branch predicate and combine the equation with an indicated relation to formulate the branch predicate. Using the branch predicate, test case generator 107 can intelligently generate and/or refine further test cases to systematically cover program paths. For example, test case generator 107 can select input values that cause conditional statements to branch to further executable instructions instead of branching to exit.

When testing memory operations, inference module 106 can generate a list of potential overrun locations.

Test case generator 107 is configured to receive indicated relationships and behaviors and intelligently generate further more meaningful test cases. For example, when testing conditional statements, test case generator 107 can generate test cases to systematically cover program paths. Test case generator 107 can use received branch predicates to eliminate input values that would halt execution before program paths are covered. For example, test case generator 107 can refrain from selecting input values that would cause a conditional statement to exit. Thus, execution can reach code within or after the conditional statement and that code can also be tested.

When testing memory operations, test case generator 107 can vary input values such that different potential overrun locations within binary code can be tested. For example, test case generator 107 can refrain from selecting input values that would cause a memory buffer overrun at some locations such that execution can continue to other locations and those other locations can also be tested.

Test case runner 104 can receive more meaningful test cases and can execute the binary code based on input values included in the more meaningful test cases. Accordingly, test can runner 104 can more efficiently test execution within or after conditional statements. Testing can be performed without having to process test cases (e.g., with randomly selected input values) that would otherwise cause execution to exit before reaching instructions within or after the conditional statements.

Returning now to further description of inference module 106, in some embodiments, inference module 106 assumes that branch predicates are linear functions and are thus solvable using algebraic techniques. Thus, the inference module can infer an equation of the general form $a_1 \cdot x_1 + a_2 \cdot x_2 + \ldots + a_{n-1} \cdot x_{n-1} + a_n$ if the program takes n−1 input variables $x_1, x_2, \ldots, x_{n-1}$. To solve the equation for each branch predicate n (different) test cases can be generated. Accordingly, in these embodiments, inference module 106 can infer a linear branch predicate from n test cases for a program that takes n−1 input variables. For example, for binary code that receives two input values (e.g., x and y), inference module 106 can infer branch predicates for conditional statements in the binary example based on three test cases. That is, the solution to the branch predicate for each conditional statement in the source code example is of the more specific form ax+by+c.

For example, for the conditional statement if (use.x−100<=0), a first test case of x=0, y=0, a second test case of x=1, y=0 and a third test case of x=0, y=1 can be used. Based on these test cases, probe instrumentation preceding the conditional statement in the corresponding binary code (e.g., probe (eax−ebx, $\leqq$), where eax is x and ebx is 100) can collect values of −100, −99, and −100. From the three equations:

$$0x+0y+c=-100 \qquad (1)$$

$$1x+0y+c=-99 \qquad (2)$$

$$0x+1y+c=-100 \qquad (3)$$

it can be determine that a=1, b=0, and c=−100, such that ax+by+c=x−100. From the relation indicated in the probe instruction, it can be then be inferred that the branch predicate is x−100≦0.

In some cases, it is not possible to generate n linearly independent test cases to reach a certain predicate. For example, if there is one statement S "if (use.x−use.y>4)" inside another statement T "if (use.x+use.y==200)", only one test case (x=100 and y=100) can reach statement S. In this case, there are n unknown coefficients and fewer than n functions, which means more than one set of coefficients will satisfy all of the functions. However, any of these solutions can be used to represent the branch predicate, because they are all equivalent under the constraints of all predicates along the path that leads to the predicate. Thus, even if it can not be determined specifically that the last predicate is x−y>4, any predicate that satisfies 100a+100b+c=−4 works, as it will drive the program to the same direction as x−y>4 for any inputs.

In other embodiments, branch predicates are non-linear functions, such as, for example, arrays. In these other embodiments, non-linear functions are broken down into a series of linear functions such that linear equations can be inferred from the branch predicates.

For example, binary code can take arrays, such as, for example, a buffer of characters, as input. Thus, it may be that binary code takes an array a along length k with input variables $x_1 \ldots x_n$. Accordingly, inference module 106 can assume that the input array elements a[0], a[1], ..., a[k−1] are scalar inputs, thereby identifying linear predicates involving constant offsets. If this does not work, inference module 106 can attempt to guess predicates of the form:

$$a[L_1(x_1 \ldots x_n)]+L_2(x_1 \ldots x_n)$$

where $L_1$ and $L_2$ are linear functions. First, the program can be run with all array elements set to zero. This allows the inference module 106 to learn $L_2$. Next, the program is run with the array initialized such that a[i]=i, for 0≦i≦k−1. Now the linear inference module learns $L_1+L_2$, a linear function. Inference module 106 can then infer $L_1$ from the previous two inferences.

In some embodiments, inference module 106 infers branch predicates for a plurality of conditional statements within a portion of binary code. Branch predicates can be generated in an iterative manner. That is, branch predicates occurring earlier in the portion of binary code can be inferred first such that test cases guaranteeing execution of later occurring conditional statements can be generated. Through iteration, inference module 106 can infer a predicate tree representing a combination of reachable execution paths for the portion of binary code.

For example, the following source code example:

```
1. struct S { int x; int y; };
2. main( int x, int y ) {
3.      S input;
4.      input.x = x;
5.      input.y = y;
6.      S use;
7.      memcpy( &use, &input, sizeof(S) );
8.      if ( use.x − 100 <= 0 )
9.          if ( use.y − 100 <= 0 )
10.             if ( use.x + use.y − 200 == 0 )
11.                 crash( );
12.     process( use.x, use.y );
13. }
``` can be compiled into binary code. The conditional statements at lines 8, 9, and 10 in the source code example can be represented by corresponding binary instructions (e.g., assembly language) in the binary code. Analysis module 102 can analyze the binary code to identify locations within the binary code preceding the represented conditional statements at lines 8, 9, and 10. Instrumentation module 103 can insert instrumentation probes (e.g., similar to probe instruction 261) into the binary code at the identified locations. The instrumentation probes can collect values supplied to the branch predicates for the represented conditional statements at lines 8, 9, and 10 during execution of test cases.

Inference module 106 can evaluate test case input values along with collected values. FIG. 3 illustrates a predicate tree 300 for conditional statements in the portion of binary code (compiled from the source code example). Inference module 106 can infer predicate tree 300 based on the evaluation of test case input values and collected values for the binary code compiled from the source code example.

Depicted in predicate tree 300 is a branch predicate for each conditional statement. For example, the branch predicates in nodes 301, 302, and 304 correspond to the conditional statements at lines 8, 9, and 10 respectively of the source code example. Also depicted in predicate tree 300 is each possible execution path that can result from evaluating a branch predicate. For example, paths to nodes 302 and 303 can result from executing the branch predicate in node 301. Paths to nodes 304 and 305 can result from executing the branch predicate in node 302. Paths to nodes 306 and 307 can result from executing the branch predicate in node 304. Thus as depicted (although not required), a resulting execution path for a branch predicate can lead to another branch predicate.

Within predicate tree 300, the value of a branch predicate is "TAKEN" if the branch predicate is satisfied. Otherwise, its value is "NOT-TAKEN". For example, an input test case of x=2 and y=200, causes the value of the branch predicate in node 301 to be "TAKEN" and the value of the branch predicate in node 302 to be "NOT-TAKEN" (and thus execution exits). A input test case of x=4 and y=9, causes the value of the branch predicate in node 301 to be "TAKEN", the value of the branch predicate in node 302 to be "TAKEN", and the value of the branch predicate in 304 to be "NOT-TAKEN" (and thus execution exits).

Inference module 106 can provide test related data (e.g., a number of branch predicates) representing predicate tree 300 to test case generation module 107. Based on the test related data, test case generation module 107 can generate test cases that cause branch predicates to be satisfied such that the execution path from node 301 to node 306 can be efficiently tested.

The following pseudo-code example represents an example algorithm for building a predicate tree for a portion of binary code:

```
/* basic_block is a node in the
the program's control flow graph */
struct basic_block {
basic_block* taken;
basic_block* not_taken;
};
/* Node is a tuple containing
* a basic block
* an execution path to the basic block */
type Node : pair< basic_block, path_expr >;
prog : input program binary
queue : set of Nodes
infer : inference module
Probit( ){
1. queue = { };
```

-continued

```
 2.  basic_block root = get_root_block( prog );
 3.  Node root_node = <root, true>;
 4.  queue.insert( root_node );
 5.  while ( queue is not empty ) {
 6.     Node node = queue.get_next( );
 7.  if( node.basic_block is an exit node )
 8.     continue;
 9.  while( infer.not_done( node ) ){
10.     input = infer.gen_test( node );
        // running prog on input should reach
        // node.basic_block along node.path_expr
11.     run_prog(prog, input);
12.     collect_probe_values( );
        }
13.  pred = infer.branch_predicate(node);
14.  taken_path = node.path_expr && pred;
15.  taken_block = node.basic_block->taken;
16.  not_taken_path = node.path_expr && !pred;
17.  not_taken_block = node.basic_block->not_taken;
18.  if( taken_path is feasible)
19.     queue.insert(<taken_block, taken_path>)
20.  if( not_taken_path is feasible)
21.     queue.insert(<not_taken_block, not_taken_path>)
     }
  }
```

The algorithm starts by obtaining the root block for a tested portion on binary code. The root block is the basic block that contains the first branch predicate. Any execution of the program has an increased likelihood (and in some embodiments is granted) to reach this block. The algorithm creates a root node from the tuple containing the root block and the predicate true, and inserts the node in the queue at line 4. The algorithm can maintain the invariant that for every node in the queue, any input that satisfiesnode.path expr reaches node.basic block In the while loop beginning at line 5, the algorithm repeatedly removes a node from the queue, infers the branch predicate for the node's basic block, and queues the block's two successors into the queue. This can happens as follows. First, if the basic block has no successors, the algorithms proceeds to the next node in the queue (lines 7 and 8). At line 9, the algorithm queries the inference module to see if enough probe values are available to infer the branch predicate. As previously described, for inferring linear branch predicate for the node <block, path>, the algorithm can utilize n test cases that reach block along the path for a program that takes n−1 input variables. However, the inference module can determine that it needs more test cases and can generating appropriate inputs. The algorithm executes the instrumented target program binary with each of such generated input and collects probe function values (lines 11 and 12). After enough test cases and probe function values are collected, the inference module is called to learn the predicate (line 13).

Newly reached child nodes are then added to the queue after the branch predicate is learned (lines 19 and 21). The algorithm ensures in lines 18 and 20, that a node is inserted into the queue when it is feasible. The algorithm continues to the head of the while loop to pick one node that is not yet learned from the queue to learn its branch predicate. Picking which one node from the queue determines the searching/learning order of the predicate tree. For example, a predicate tree can be learned using Breadth First Search (BFS), Depth First Search (DFS), or random search. Alternately, heuristics can be used to learn the more important nodes first, such as, for example, nodes with the most number of unlearned predicates in their subtrees. The use of heuristics can provide more appropriate coverage in limited resource environments, for example, that restrict the number of nodes that can be learned.

When inference module 106 is unable to infer a specific branch predicate in a predicate tree, inference module 106 can revert to generating random inputs that satisfy other constraints in the path up to the conditional statement. Further, inference module 106 can still infer branch predicates in other sub-trees of the predicate tree.

Figure 4:
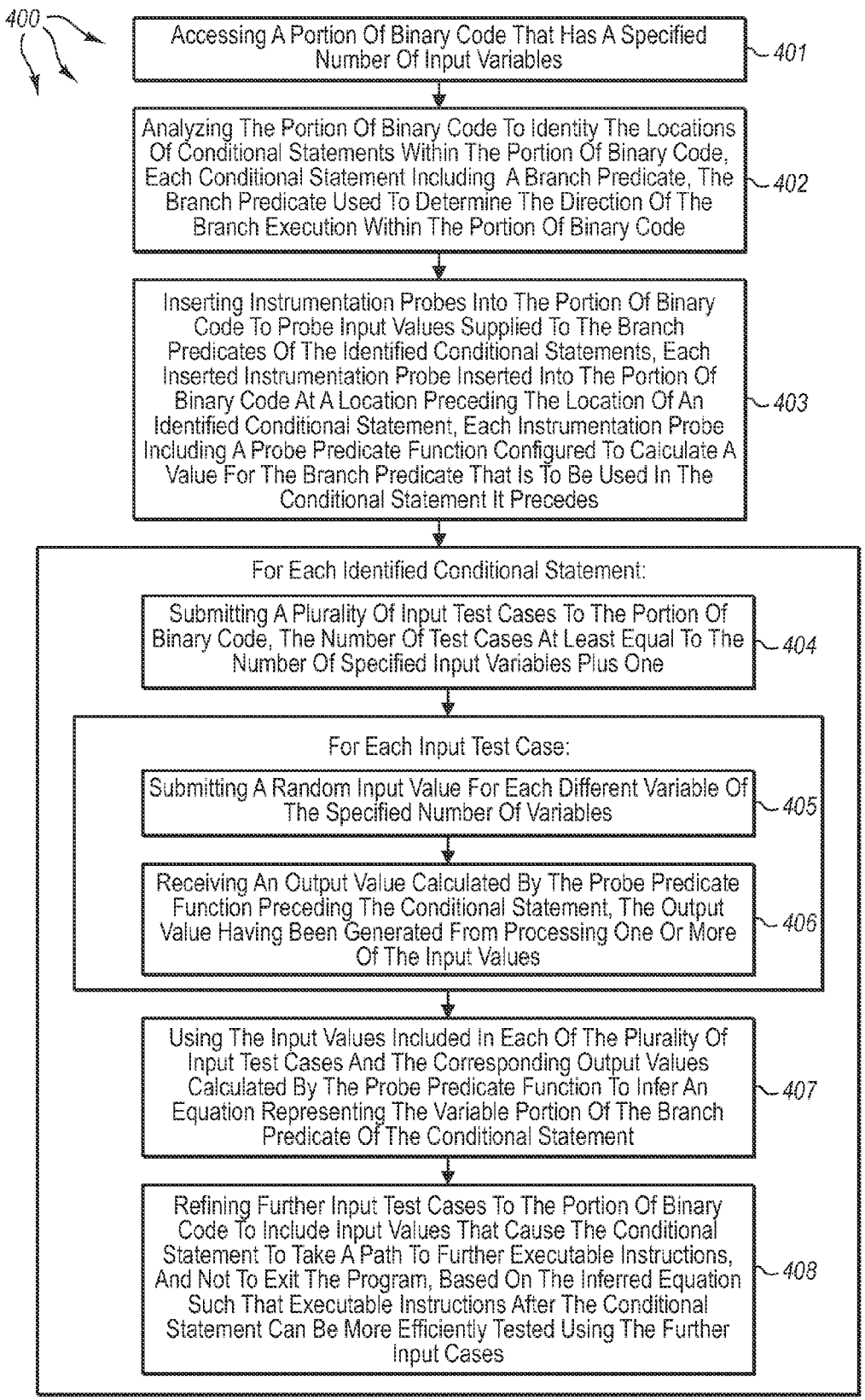
FIG. 4 illustrates a flow chart of an example method for automatically generating test cases for testing binary code.

FIG. 4 illustrates a flow chart of an example method 400 for automatically generating test cases for testing binary code. The method 400 will be described with respect to the data and modules in computer architecture 100 and occasional reference to predicate tree 300.

Method 400 includes an act of accessing a portion of binary code that has a specified number of input variables (act 401). For example, code testing module 101 can access binary code 116. Binary code 116 can be compiled code that was compiled from source code 111, which includes conditional statements 112 and 113 and memory allocation instruction 114.

Method 400 includes an act of analyzing the portion of binary code to identify the locations of conditional statements within the portion of binary code, each conditional statement including a branch predicate, the branch predicate used to determine the direction of the branch execution within the portion of binary code (act 402). For example, analysis module 102 can analyze binary code 116 to identify the locations of conditional statements 112 and 113 within binary code 116. Analysis module 102 can also analyze binary code 116 to identify the relation (e.g., $\leq$, $>$, $\neq$, etc.) for each conditional statement 112 and 113. Analysis module 102 can output analyzed binary code that indicated the locations of conditional statements 112 and 113.

Method 400 includes an act of inserting instrumentation probes into the portion of binary code to probe input values supplied to the branch predicates of the identified conditional statements, each inserted instrumentation probe inserted into the portion of binary code at a location preceding the location of an identified conditional statement, each instrumentation probe including a probe predicate function configured to calculate a value for the branch predicate that is to be used in the conditional statement it precedes (act 403). For example, instrumentation module 103 can receive analyzed code 177. Instrumentation module 103 can insert instrumentation probes into analyzed code 117 to probe input values supplied to the branch predicates of conditional statements 112 and 113. Instrumentation module 103 can insert instrumentation probes into analyzed binary code 117 at a location (potentially immediately) preceding the location of conditional statement 112 and at a location (potentially immediately) preceding the location of conditional statement 113.

Each instrumentation probe that instrumentation module 113 inserts into analyzed code 117 can include a probe predicate function configured to calculate a value for the branch predicate that is to be used in the conditional statement it precedes. Each instrumentation probe that instrumentation module 103 inserts into analyzed code 117 can also include a relation symbol that indicates the relation used in the conditional statement it precedes. Instrumentation module 103 can output instrumented binary code 188 that includes any inserted instrumentation probes.

For each identified conditional statement, method 400 includes an act of submitting a plurality of input test cases to the portion of binary code, the number of test cases at least equal to the number of specified input variables plus one (act 404). For example, for conditional statement 112, test case runner 104 can submit test cases 121, 122, and 123, to binary instrumented binary code 118. Since instrumented binary code 118 receives two input variables (x and y), test case runner 104 can submit three test cases. For conditional statement 113, test case runner 104 can also submit three (potentially different) test cases.

For each input test case, method 400 includes an act of submitting a random input value for each different variable of the specified number of variables (act 405). For example, for conditional statement 112, test case runner 104 can submit values 121A (x=1) and 121B (y=2) for test case 121, values 122A (x=2) and 121B (y=1) for test case 122, and values 123A (x=0) and 123B (y=0) for test case 123.

For each input test case, method 400 includes an act of receiving an output value calculated by the probe predicate function preceding the conditional statement, the output value having been generated from processing one or more of the input values (act 406). For example, for conditional statement 112, test case runner 104 can receive output values 131, 132, and 133. Output values 131, 132, and 133 are calculated by the probe predicate function preceding conditional statement 112. The probe predicate function can process (e.g., perform mathematical operations on) the input values, such as, for example, input values 121A (x=1) and 121B (y=2), to generate a corresponding output value, such as, for example, output value 131. Test case runner 104 can also output the indicated relation for the conditional statement along with the output value.

For each identified conditional statement, method 400 includes an act of using the input values included in each of the plurality of input test cases and the corresponding output values calculated by the probe predicate function to infer an equation representing the variable portion of the branch predicate of the conditional statement (act 407). For example, for conditional statement 112, inference module 106 can receive test cases 121, 123, and 123 and corresponding output values 131, 132 and 133. Inference module 106 can infer an equation representing the variable portion of the branch predicate for conditional statement 112 from the received test case input values and corresponding output values. Inference module 106 can combine the inferred equation with the indicated relation for conditional statement 112 to formulate the branch predicated for conditional statement 112. For example, inference module 106 can formulate branch predicate 151 for conditional statement 112.

The branch predicate for conditional statement 113 can be similarly formulated. When appropriate, branch predicates can be related to one another in a predicated tree (similarly to predicate tree 300). Inference module 106 can send a formulated branch predicate (e.g., branch predicate 151) or predicate tree to test case generator 107.

For each identified conditional statement, method 400 includes an act of refining further input test cases to the portion of binary code to include input values that cause the conditional statement to take a path to further executable instructions, and not to exit the program, based on the inferred equation such that executable instructions after the conditional statement can be more efficiently tested using the further input cases (act 408). For example, test case generator 107 can generate refined test cases 153 based on branch predicate 151 to cause conditional statement 112 to take a path to conditional statement 113 (e.g., a value of "TAKEN") and not exit instrumented binary code 118. Accordingly, executable instructions after conditional statement 112 can be more efficiently tested using the further input cases. For example, test case generator 107 can avoid using input values that cause the value of conditional statement 112 to be "NOT-TAKEN".

Figure 5:
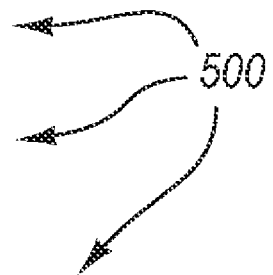
FIG. 5 illustrates a dynamic program path for allocating memory and accessing an offset within the allocated memory.

As previously described, embodiments of the invention can also be used to test memory operations. FIG. 5 illustrates a dynamic program path 500 for allocating memory and accessing an offset within the allocated memory. On a particular input, the program allocates a memory region of size n. Subsequently, it accesses the region at an offset r. To check for bounds at the write instruction at line 3, one needs to know the length of the region pointed to by the variable q, and its offset within that region To obtain those values, instrumentation probes can be inserted in locations prior to memory operations. For example, instrumentation probes can be inserted prior to every memory allocation point to collect the address and length of an allocated memory region. Instrumentation probes can also be inserted prior to every memory access to collect the address that is to be accessed. Instrumentation probes can also be inserted prior to every memory deallocation point to collect the address that is freed up. Random test cases can then be run to provide appropriate data to inference module 106.

Inference module 106 can determine the memory region accessed by a memory access instruction by doing a range search. In dynamic program path 500, inference module 106 is able to infer that the instruction at line 3 accesses the memory region allocated at line 1. Inference module 106 can then infer the length of the region n and the offset q-p, as functions of the inputs. If $x_1 \ldots x_n$ are the inputs to the program, $P(x_1 \ldots x_n)$ the conjunction of all branch predicates along this path, $L(x_1 \ldots x_n)$ the length of the region allocated at line 1, and $I(x_1 \ldots x_n)$ the offset of the pointer q in the region, then inference module 106 checks if the following formula is valid $$P(x_1 \ldots x_n)) \to 0 \leq I(x_1 \ldots x_n) \leq L(x_1 \ldots x_n) - 1$$

Otherwise, inference module 106 causes test case generator 107 to generate an input that can result in a buffer.

Figure 6:
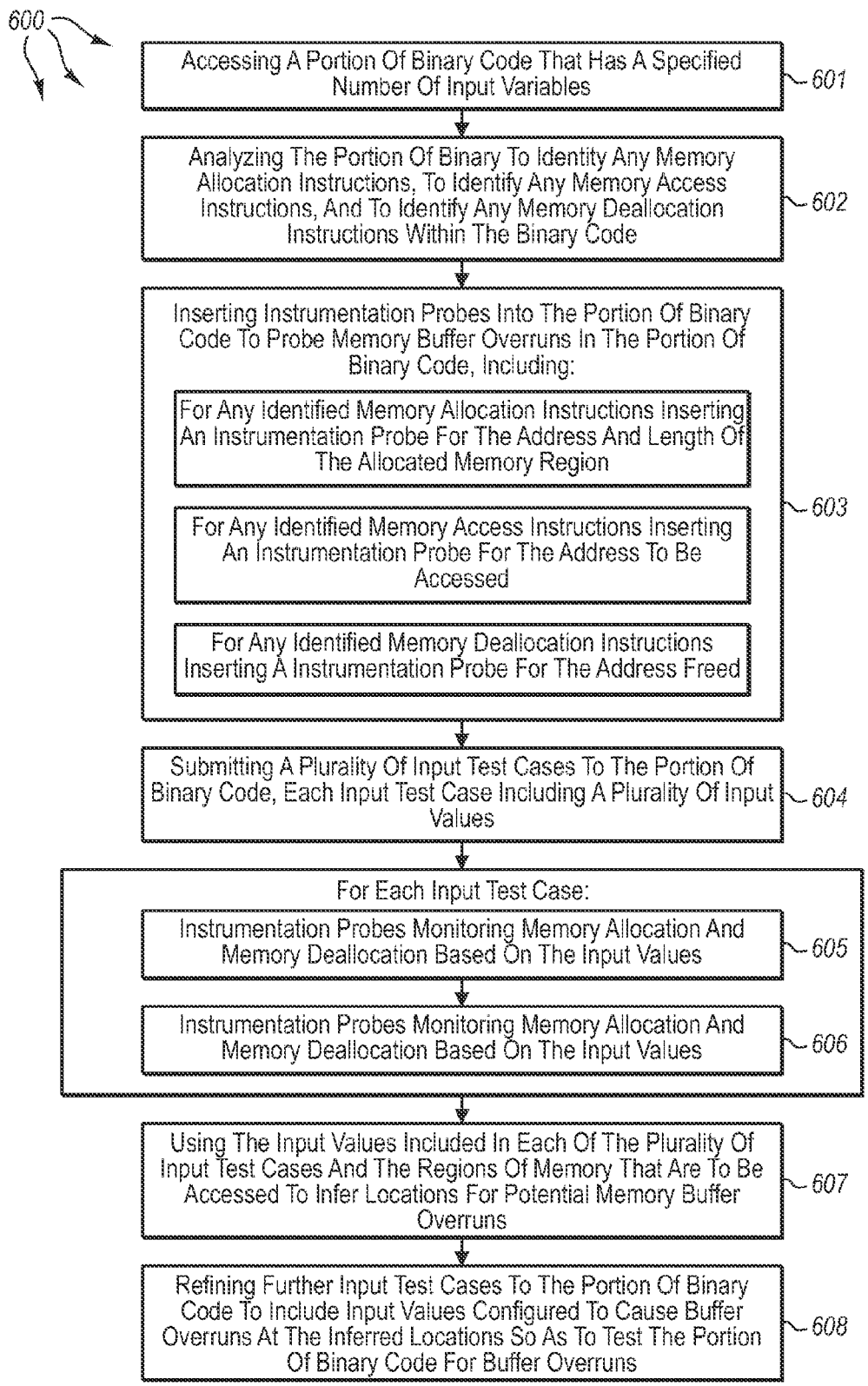
FIG. 6 illustrates a flow chart of an example method for automatically generating test cases for testing binary code for memory buffer overruns.

FIG. 6 illustrates a flow chart 600 of an example method for automatically generating test cases for testing binary code for memory buffer overruns. The method 600 will be described with respect to the data and modules in computer architecture 100 and occasional reference to the dynamic program path 500.

Method 600 includes an act of accessing a portion of binary code that has a specified number of input variables (act 601). For example, code testing module 101 can access binary code 116. Binary code 116 can be compiled code that was compiled from source code 111, which includes conditional statements 112 and 113 and memory allocation instruction 114.

Method 600 includes an act of analyzing the portion of binary to identify any memory allocation instructions, to identify any memory access instructions, and to identify any memory deallocation instructions within the binary code (act 602). For example, analysis module 102 can analyze binary code 106 to identify memory allocation instructions, such as, for example, memory allocation instruction 114, memory access instructions, and memory deallocation instructions.

Method 600 includes an act of inserting instrumentation probes into the portion of binary code to probe memory buffer overruns in the portion of binary code (act 603). For example, instrumentation module 103 can insert instrumentation probes into analyzed binary code 117. Instrumentation probes can be inserted for any identified memory allocation instructions to collect values for the address and length of the allocated memory region. Instrumentation probes can be inserted for any identified memory access instructions to collect values for the address to be accessed. Instrumentation probes can be inserted for any identified memory deallocation instructions to collect values for the address freed.

Method 600 includes an act of submitting a plurality of input test cases to the portion of binary code, each input test case including a plurality of input values (act 604). For example, test case runner 104 can submit test cases 121, 122, and 123, to instrumented binary code 118.

For each input test case method 600 includes an act of instrumentation probes monitoring memory allocation and memory deallocation based on the input values (act 605). For example, instrumentation probes can monitor memory allocation and memory deallocation in instrumented binary code 108 based on input values 121A (x=2) and 121B (y=1). Instrumentation probes can output collected values related to memory allocation and memory deallocation.

For each input test case method 600 includes an act of instrumentation probes determining the memory region a memory access instruction is to access by doing a range search based on the input values (act 606). For example, instrumentation probes can determining the memory region a memory access instruction in instrumented binary code 108 is to access by doing a range search based on input values 121A (x=2) and 121B (y=1). Instrumentation probes can output collected values related to memory access, such as, for example, memory regions 142 and 143.

Method 600 includes an act of using the input values included in each of the plurality of input test cases and the regions of memory that are to be accessed to infer locations for potential memory buffer overruns (act 607). For example, inference module 106 can used test cases 122 and 123 and memory regions 142 and 142 respectively to infer potential buffer overrun locations within instrumented binary code 108. Inference module 106 can provide inferred potential overrun locations, such as, for example, overrun location 152, to test case generator 107.

Method 600 includes an act of refining further input test cases to the portion of binary code to include input values configured to cause buffer overruns at the inferred locations so as to test the portion of binary code for buffer overruns (act 608). For example, test case generator 107 can generate refined test cases 153 to cause buffer overruns at overrun location 152.

Accordingly, embodiments of the present invention can automatically generate test inputs for systematically covering program execution paths within binary code. By monitoring program execution of the binary code on existing or random test cases, branch predicates on execution paths can be dynamically inferred. These inferred branch predicates can then be used to drive the program along previously unexplored paths, enabling the learning of further execution paths. Embodiments of the invention can be used in combination with other analysis and testing techniques to provide better test coverage and expose program errors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, a method for automatically generating test cases for testing binary code, the method comprising:
    an act of accessing a portion of binary code that has a specified number of input variables;
    an act of analyzing the portion of binary code to identify the locations of conditional statements within the portion of binary code, each conditional statement including a branch predicate, the branch predicate used to determine the direction of the branch execution within the portion of binary code;
    an act of inserting instrumentation probes into the portion of binary code to probe input values supplied to the branch predicates of the identified conditional statements, each inserted instrumentation probe inserted into the portion of binary code at a location preceding the location of an identified conditional statement, each instrumentation probe including a probe predicate function configured to calculate a value for the branch predicate that is to be used in the conditional statement it precedes;
    for each identified conditional statement:
        an act of submitting a plurality of input test cases at least equal to the number of specified input variables to the portion of binary code plus one;
        for each input test case:
            an act of submitting a random input value for each different variable of the specified number of variables;
            an act of receiving an output value calculated by the probe predicate function preceding the conditional statement, the output value having been generated from processing one or more of the input values;
        an act of using the input values included in each of the plurality of input test cases and the corresponding output values calculated by the probe predicate function to infer an equation representing the variable portion of the branch predicate of the conditional statement; and
        an act of refining further input test cases to the portion of binary code to include input values that cause the conditional statement to take a path to further executable instructions, and not to exit the program, based on the inferred equation such that executable instructions after the conditional statement can be more efficiently tested using the further input cases.

2. The method as recited in claim 1, further comprising:
    an act of analyzing the portion of binary code to identify relations associated with conditional statements within the portion of binary code.

3. The method as recited in claim 2, wherein the act of identify relations associated with conditional statements comprises an act of identifying a relation selected from among: greater than, greater than or equal to, less than, less than or equal to, equal to, and not equal to.

4. The method as recited in claim 1, wherein the act of inserting instrumentation probes into the portion of binary code to probe input values supplied to the branch predicates of the identified conditional statements comprises an act of inserting an instrumentation probe that indicates the relation associated with the branch predicate of an identified conditional statement.

5. The method as recited in claim 4, wherein the act of inserting instrumentation probes into the portion of binary code to probe input values supplied to the branch predicates of the identified conditional statements comprises an act of inserting instrumentation probes configured to perform a mathematical operation on the input values supplied to the branch predicates based on the associated relations, the results of the mathematical operation resulting in the output for the instrumentation probe.

6. The method as recited in claim 1, wherein the act of receiving an output value calculated by the probe predicate function preceding the conditional statement comprises an act of receiving an output value and an indication of the relation associated with the conditional statement 7. The method as recited in claim 6, further comprising:
an act of combining the inferred equation with the identified relation to formulate a branch predicate for the conditional statement.

8. The method as recited in claim 7, further comprising:
an act of adding the formulated branch predicate to a predicate tree for the portion of binary code.

9. The method as recited in claim 1, where the act of inferring an equation representing the variable portion of the branch predicate of the conditional statement comprises an act of solving a linear equation representing the variable portion of the branch predicate based on the input values and corresponding output values.

10. The method as recite in claim 1, further comprising:
an act of decomposing an array of input values into a corresponding number of linear equations prior to inferring an equation;

11. The method as recited in claim 1, wherein the an act of refining further input test cases to the portion of binary code comprises an act of refining further input test cases to the portion of binary code based on a predicate tree that has a predicate branch including the inferred equation.

12. At a computer system, a method for automatically generating test cases for testing binary code for memory buffer overruns, the method comprising:
an act of accessing an portion of binary code that has a specified number of input variables;
an act of analyzing the portion of binary to identify any memory allocation instructions, to identify any memory access instructions, and to identify any memory deallocation instructions within the binary code;
an act of inserting instrumentation probes into the portion of binary code to probe memory buffer overruns in the portion of binary code, including:
for any identified memory allocation instructions inserting an instrumentation probe for the address and length of the allocated memory region;
for any identified memory access instructions inserting an instrumentation probe for the address to be accessed; and
for any identified memory deallocation instructions inserting a instrumentation probe for the address freed;
an act of submitting a plurality of input test cases to the portion of binary code, each input test case including a plurality of input values;
for each input test case:
an act of instrumentation probes monitoring memory allocation and memory deallocation based on the input values; and
an act of instrumentation probes determining the memory region a memory access instruction is to access by doing a range search based on the input values;
an act of using the input values included in each of the plurality of input test cases and the regions of memory that are to be accessed to infer locations for potential memory buffer overruns; and
an act of refining further input test cases to the portion of binary code to include input values configured to cause buffer overruns at the inferred locations so as to test the portion of binary code for buffer overruns.

13. A computer program product for use at a computer system, the computer program product for implementing a method for automatically generating test cases for testing binary code, the computer-program product comprising one or more computer-readable media having stored thereon computer-executable instructions that, when executed at a processor, cause the computer system to perform the following:
access a portion of binary code that has a specified number of input variables;
analyze the portion of binary code to identify the locations of conditional statements within the portion of binary code, each conditional statement including a branch predicate, the branch predicate used to determine the direction of the branch execution within the portion of binary code;
insert instrumentation probes into the portion of binary code to probe input values supplied to the branch predicates of the identified conditional statements, each inserted instrumentation probe inserted into the portion of binary code at a location preceding the location of an identified conditional statement, each instrumentation probe including a probe predicate function configured to calculate a value for the branch predicate that is to be used in the conditional statement it precedes;
for each identified conditional statement:
submit a plurality of input test cases at least equal to the number of specified input variables to the portion of binary code plus one;
for each input test case:
submit a random input value for each different variable of the specified number of variables;
receive an output value calculated by the probe predicate function preceding the conditional statement, the output value having been generated from processing one or more of the input values;
use the input values included in each of the plurality of input test cases and the corresponding output values calculated by the probe predicate function to infer an equation representing the variable portion of the branch predicate of the conditional statement; and
refine further input test cases to the portion of binary code to include input values that cause the conditional statement to take a path to further executable instructions, and not to exit the program, based on the inferred equation such that executable instructions after the conditional statement can be more efficiently tested using the further input cases.

14. The computer program product of claim 13, furthering comprising computer-executable instructions that, when executed, cause the computer system to analyze the portion of binary code to identify relations associated with conditional statements within the portion of binary code.

15. The computer program product of claim 13, wherein computer-executable instructions that, when executed, cause the computer system to insert instrumentation probes into the portion of binary code to probe input values supplied to the branch predicates of the identified conditional statements comprise computer-executable instructions that, when executed, cause the computer system to insert an instrumentation probe that indicates the relation associated with the branch predicate of an identified conditional statement.

16. The computer program product of claim 15, wherein computer-executable instructions that, when executed, cause the computer system to insert instrumentation probes into the portion of binary code to probe input values supplied to the branch predicates of the identified conditional statements comprise computer-executable instructions that, when executed, cause the computer system to insert instrumentation probes configured to perform a mathematical operation on the input values supplied to the branch predicates based on the associated relations, the results of the mathematical operation resulting in the output for the instrumentation probe.

17. The computer program product of claim 13, wherein computer-executable instructions that, when executed, cause the computer system to receive an output value calculated by the probe predicate function preceding the conditional statement comprise computer-executable instructions that, when executed, cause the computer system to receive an output value and an indication of the relation associated with the conditional statement.

18. The computer program product of claim 17, furthering comprising computer-executable instructions that, when executed, cause the computer system to combining the inferred equation with the identified relation to formulate a branch predicate for the conditional statement.

19. The computer program product of claim 18, furthering comprising computer-executable instructions that, when executed, cause the computer system to add the formulated branch predicate to a predicate tree for the portion of binary code.

20. The computer program product of claim 13, wherein computer-executable instructions that, when executed, cause the computer system to infer an equation representing the variable portion of the branch predicate of the conditional statement comprise computer-executable instructions that, when executed, cause the computer system to solve a linear equation representing the variable portion of the branch predicate based on the input values and corresponding output values.

* * * * *